US010690474B2

(12) United States Patent
Abe

(10) Patent No.: US 10,690,474 B2
(45) Date of Patent: Jun. 23, 2020

(54) OPERATION METHOD OF POSITION MEASURING DEVICE

(71) Applicant: Mitutoyo Corporation, Kawasaki, Kanagawa (JP)

(72) Inventor: Shinsaku Abe, Iwamizawa (JP)

(73) Assignee: MITUTOYO CORPORATION, Kawasaki (JP)

( * ) Notice: Subject to any disclaimer, the term of this patent is extended or adjusted under 35 U.S.C. 154(b) by 101 days.

(21) Appl. No.: 15/987,439

(22) Filed: May 23, 2018

(65) Prior Publication Data

US 2018/0340763 A1 Nov. 29, 2018

(30) Foreign Application Priority Data

May 29, 2017 (JP) ................................ 2017-105947

(51) Int. Cl.
*G01B 5/012* (2006.01)
*G06F 3/041* (2006.01)
(Continued)

(52) U.S. Cl.
CPC ............ *G01B 5/012* (2013.01); *G01B 5/008* (2013.01); *G01B 21/047* (2013.01); *G06F 3/041* (2013.01)

(58) Field of Classification Search
CPC ...... G01B 5/008; G01B 21/047; G01B 21/04; G01B 5/207; G01B 11/245; G01B 2210/52; G01B 2210/58; G01B 11/002
(Continued)

(56) References Cited

U.S. PATENT DOCUMENTS 4,631,834 A * 12/1986 Hayashi ................ G01B 5/008 33/1 M
4,908,951 A * 3/1990 Gurny ................. G01B 11/005 33/1 M (Continued)

FOREIGN PATENT DOCUMENTS

| JP | H07-151512 | 6/1995 |
|---|---|---|
| JP | 2006-349547 | 12/2006 |
| JP | 2015-059825 | 3/2015 |

*Primary Examiner* — Yaritza Guadalupe-McCall

(74) *Attorney, Agent, or Firm* — Rankin, Hill & Clark LLP

(57) ABSTRACT

To provide an operation method of a position measuring device capable of accurately and quickly designating a detection point of an object by intuitive operability, such as directly moving the probe with a hand. One aspect of the present invention is an operation method of a position measuring device that includes a measurement head having a probe for designating a detection point of a position of an object, and a moving mechanism for moving the measurement head, and acquires a coordinate of the detection point designated by the probe. The operation method of a position measuring device includes the steps of: using a terminal device including an image acquisition part and a display part to acquire an image of the probe by the image acquisition part and display the image on the display part; detecting a relative positional relation between the probe and the terminal device when having received a movement instruction by the terminal device in a state where an image of the probe is displayed on the display part; and performing a movement control of the measurement head following the movement instruction received by the terminal device by actuating the moving mechanism on the basis of the positional relation.

10 Claims, 12 Drawing Sheets

(51) Int. Cl.
*G01B 5/008* (2006.01)
*G01B 21/04* (2006.01)

(58) Field of Classification Search
USPC ............................................................ 33/503
See application file for complete search history.

(56) References Cited

U.S. PATENT DOCUMENTS

2008/0236260 A1* 10/2008 Noda .................... G01B 5/008
73/105
2010/0018069 A1* 1/2010 Ould .................... G01B 21/042
33/503
2011/0056085 A1* 3/2011 Jordil .................... G01B 5/008
33/503
2011/0192044 A1* 8/2011 Usui .................... G01B 5/008
33/503
2013/0283627 A1* 10/2013 Noda .................... G01B 21/04
33/503
2014/0025336 A1* 1/2014 Noda .................. G01B 21/042
702/168
2015/0077761 A1 3/2015 Yamagata
2016/0018207 A1* 1/2016 Fuchs .................. G01B 21/045
702/95
2016/0307311 A1* 10/2016 Udo ...................... G01B 11/24
2017/0248409 A1* 8/2017 Sakai ................ G01B 11/2441
2017/0299368 A1* 10/2017 Mayinger ................ G01B 5/28
2017/0370689 A1* 12/2017 Hemmings .......... G01B 21/045
2018/0017954 A1* 1/2018 Noda .................... G01B 5/008
2018/0058832 A1* 3/2018 Nakagawa ........... G01B 21/042
2018/0058843 A1* 3/2018 Tabuchi ................. G01B 21/04
2018/0073853 A1* 3/2018 Mayinger .............. G01B 11/30
2018/0156594 A1* 6/2018 Jansson ................ G01B 21/047
2018/0299247 A1* 10/2018 Honda ................. G01B 5/0004
2018/0340763 A1* 11/2018 Abe ........................ G06F 3/041
2019/0017797 A1* 1/2019 Tamai .................... G01B 5/016
2019/0107379 A1* 4/2019 Singh ..................... G01B 5/012
2019/0120664 A1* 4/2019 Abe ......................... G01D 5/39
2019/0219387 A1* 7/2019 Sakai ..................... G06K 9/685
2019/0242702 A1* 8/2019 Singh ..................... G01B 5/008
2019/0316893 A1* 10/2019 Singh .................. G05B 19/401

* cited by examiner

OPERATION METHOD OF POSITION MEASURING DEVICE

CROSS-REFERENCE TO RELATED APPLICATION

This non-provisional application claims priority under 35 U.S.C. § 119(a) from Japanese Patent Application No. 2017-105947, filed on May 29, 2017, the entire contents of which are incorporated herein by reference.

BACKGROUND

Technical Field

The present invention relates to an operation method of a position measuring device that measures a position of an object by designating a detection point with a probe of a measurement head.

Background Art

A measurement head used in a three-dimensional measuring system or the like is provided with a probe, a tip of the probe is made to contact with an object to be measured, and thereby a position is measured with a measuring point designated. A computer is connected to such a three-dimensional measuring system. Application software executed by the computer performs various processing, such as registration of a measuring point and totalization of a measurement result.

Generally, instructions to a computer are performed by using an input device, such as a mouse or a keyboard. JP 7-151512 A discloses an operation device of a three-dimensional measuring machine that operates a position of a probe of a measurement head by a joystick. Further, JP 2015-059825 A discloses a three-dimensional measuring device that operates a non-contact probe with a joystick JP 2006-349547 A discloses a non-contact three-dimensional shape measuring method that preliminarily sets a moving position of a measurement head using a computer by an input operation part and moves the measurement head according to a program to perform measurement.

SUMMARY OF THE INVENTION

Problems to be Solved by the Invention

In such a position measuring device, the operation of an input device for moving a probe requires practice in order to accurately designate a detection point of an object to be measured with the probe. For example, the measurement head can move in a three-dimensional direction of XYZ directions, and the probe provided on the measurement head can be rotated at a predetermined angle. Practice is required to quickly and accurately perform these operations with a joystick. Further, in a case of automatically moving the measurement head or the probe according to a program, highly professional knowledge is required for setting of the program.

The present invention aims to provide an operation method of a position measuring device capable of accurately and quickly designating a detection point of an object by intuitive operability, such as directly moving the probe with a hand.

Means for Solving the Problems

One aspect of the present invention is an operation method of a position measuring device that includes, a measurement head having a probe for designating a detection point of a position of an object, and a moving mechanism for moving the measurement head, and acquires a coordinate of the detection point designated by the probe. The operation method of a position measuring device includes the steps of: using a terminal device including an image acquisition part and a display part to acquire an image of the probe by the image acquisition part and display the image on the display part; detecting a relative positional relation between the probe and the terminal device when having received a tracking instruction by the terminal device in a state where an image of the probe is displayed on the display part; and performing a movement control of the measurement head following the movement instruction received by the terminal device by actuating the moving mechanism on the basis of the positional relation.

According to such an operation method of a position measuring device, it is possible to perform a movement control of a measurement head following a movement instruction received by a terminal device by acquiring an image of a probe by the terminal device, causing a display part of the terminal device to display the image, and performing a tracking instruction. Therefore, a worker can move a position of the probe by using the terminal device while referring to the image of the probe displayed on the display part of the terminal device.

In the operation method of the position measuring device, the step of performing a movement control of the measurement head may include moving the measurement head following movement of the terminal device so that a display position of the image of the probe on the display part when having received the tracking instruction is fixed. This makes it possible to move the measurement head following the movement of the terminal device by moving the terminal device in a state where the display position of the probe displayed on the display part is fixed.

The operation method of the position measuring device may further include the steps of releasing a state where the display position of the image of the probe on the display part is fixed; and stopping movement of the measurement head in a state where fixing of the display position is released. This makes it possible to stop the movement control of the measurement head following the movement of the terminal device by releasing fixing of the display position of the probe displayed on the display part.

In the operation method of the position measuring device, the step of performing a movement control of the measurement head may include stopping the movement of the measurement head in a case where an acceleration speed when the terminal device has moved exceeds a preset value. This makes it possible to stop the movement of the measurement head when the terminal device is moved rapidly, and to suppress an unnecessary motion of the measurement head.

In the operation method of the position measuring device, the step of performing a movement control of the measurement head may include, in a case where the terminal device has moved exceeding a preset range from a state where the terminal device does not move, starting movement of the measurement head following the movement of the terminal device. This makes it possible to suppress an unnecessary motion of the measurement head in a case where unintended vibration (such as hand trembling) of the terminal device has occurred.

In the operation method of the position measuring device, the step of performing a movement control of the measurement head may include varying an angle of the probe in accordance with rotational movement of the terminal device. This makes it possible to rotate the probe by rotating the terminal device and to perform an intuitive operation In the operation method of the position measuring device, the position measuring device, according to a predetermined movement operation for the terminal device, may perform processing by regarding that a specific command corresponding to the movement operation has been input. This makes it possible to facilitate input of various commands. Note that, a specific command may be a command for determining an end point position of movement or the like.

In the operation method of a position measuring device, the display part has a touch sensor, and the step of performing a movement control of the measurement head may include, after having received the tracking instruction, moving the measurement head on the basis of a distance of contact and a direction of contact detected by the touch sensor. This makes it possible to move the measurement head on the basis of information detected by the touch sensor, by tracing the measurement head displayed on the display part.

One aspect of the present invention is an operation method of a position measuring device that includes a measurement head having a probe for designating a detection point of a position of an object, and a moving mechanism for moving the measurement head, and acquires a coordinate of the detection point designated by the probe. The operation method of a position measuring device includes the steps of detecting a position of a specific region of a worker's body by a three-dimensional position sensor to detect a relative positional relation between the specific region and the probe, and detecting motion of the specific region by the three-dimensional position sensor to perform a movement control of the measurement head following the motion of the specific region by actuating the moving mechanism on the basis of the positional relation and the motion of the specific region.

According to such an operation method of a position measuring device, moving the specific region of a worker's body makes it possible to move the measurement head following the motion. That is, moving the specific region of a body makes it possible to move the measurement head without touching the measurement head.

In the operation method of a position measuring device, the specific region is a hand, and the step of performing a movement control of the measurement head may include moving the measurement head on the basis of a type of motion, a motion amount, and a motion direction of the hand. This makes it possible to move the measurement head on the basis of a type of motion, a motion amount, and a motion direction of the hand without touching the measurement head.

DETAILED DESCRIPTION OF THE EMBODIMENTS

Figure 1:
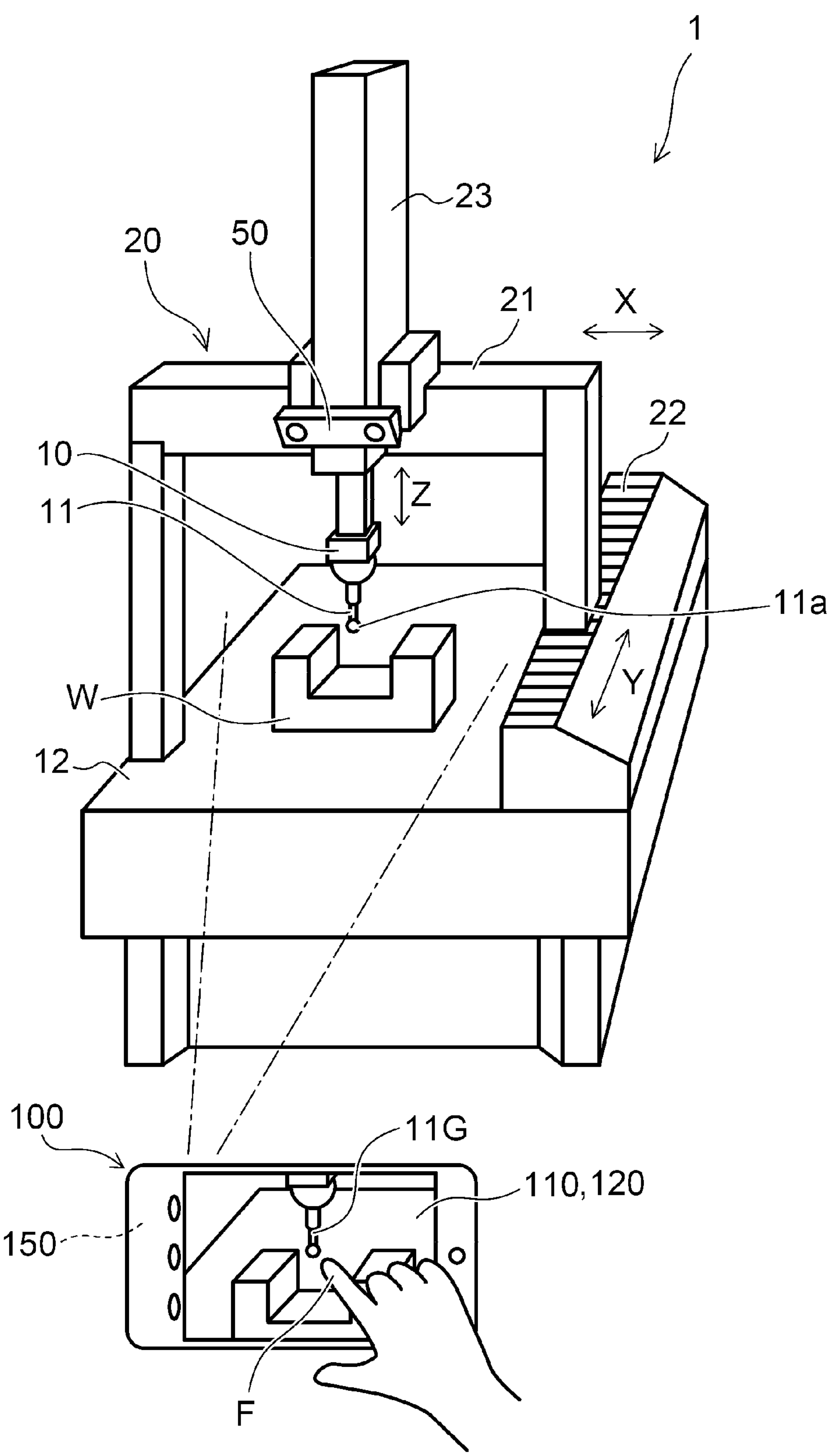
FIG. 1 is a schematic diagram exemplifying a configuration of a position measuring device according to the present embodiment.

A detailed description will hereinafter be given of an embodiment of the present invention with consultation of drawings. Incidentally, in the following description, an identical reference numeral will be attached to the same member, and explanation of a member once explained will be appropriately omitted.

(Configuration of Position Measuring Device)

FIG. 1 is a schematic diagram exemplifying a configuration of a position measuring device according to the present embodiment.

A position measuring device 1 according to the present embodiment is, for example, a three-dimensional measuring device that measures a coordinate of a detection point, such as a surface of an object W. The position measuring device 1 includes a measurement head 10 having a probe 11 for designating a detection point of a position of the object W and a moving mechanism 20 for moving the measurement head 10. A computer system (not shown) may be connected to the position measuring device 1. The computer system executes necessary data processing to calculate three-dimensional coordinates and the like of the object W.

The object W is placed on a stage 12. A moving mechanism 20 for moving the measurement head 10 is provided on the stage 12. The moving mechanism 20 includes an X-axis guide 21, a Y-axis guide 22, and a Z-axis guide 23. In the present embodiment, an X-axis direction (direction along the X-axis) is one direction along a surface of the stage 12. A Y-axis direction (direction along the Y-axis) is a direction along the surface of the stage 12 and a direction orthogonal to the X-axis direction. A Z-axis direction (direction along the Z-axis) is a direction orthogonal to the X-axis direction and the Y-axis direction. The Z-axis direction is also called a vertical direction. In addition, the X-axis direction and the Y-axis direction are also called a horizontal direction.

In the present embodiment, the Z-axis guide 23 that moves the measurement head 10 in the Z-axis direction (vertical direction) is provided capable of moving in the X-axis direction by the X-axis guide 21. The X-axis guide 21 is provided capable of moving in the Y-axis direction by the Y-axis guide 22. The combination of the X-axis guide 21, the Y-axis guide 22, and the Z-axis guide 23 allows the measurement head 10 to move to a predetermined position in three axis directions of XYZ.

A probe 11 for designating a detection point of a position of the object W is provided on the measurement head 10. The probe 11 may be a contact type or a non-contact type. The contact probe 11 performs coordinate detection by causing a gauge head 11$a$ provided at the tip of the probe 11 to contact a detection point of the object W. The non-contact probe 11 irradiates a detection point of the object W with, for example, laser light and receives the reflected light, to thereby detect the coordinate of a position irradiated with the laser light.

(System Configuration)

Figure 2:
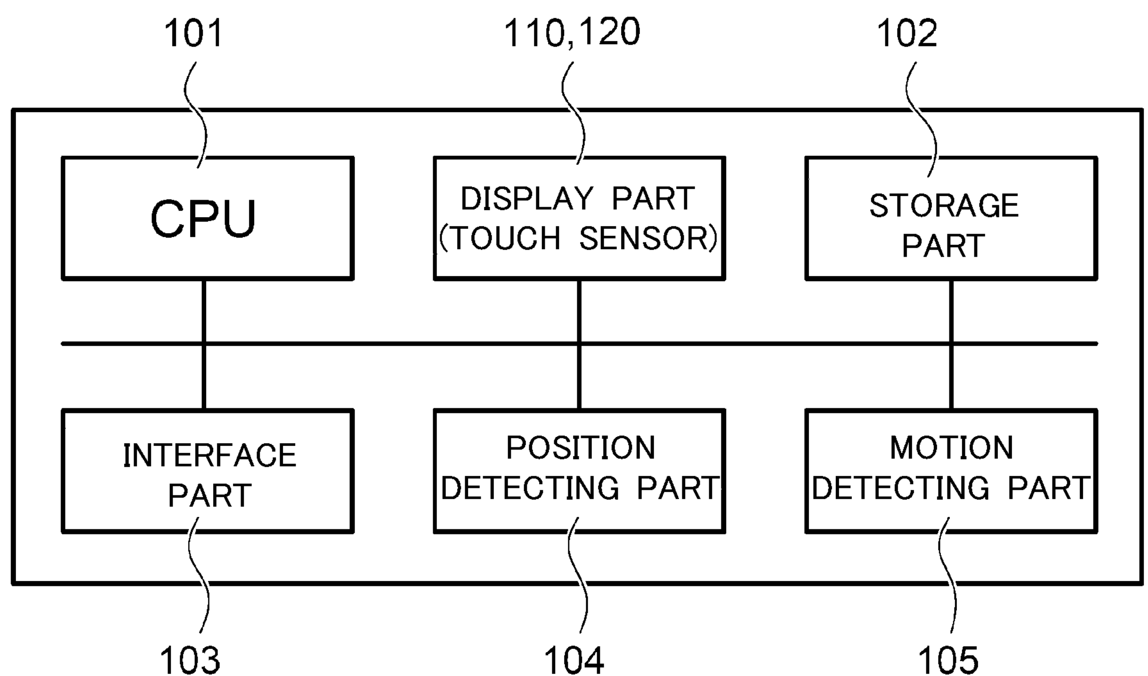
FIG. 2 is a block diagram showing one example of a system configuration for realizing an operation method according to the present embodiment.

FIG. 2 is a block diagram showing one example of a system configuration for realizing an operation method according to the present embodiment.

The system includes a central arithmetic part 101, a display part 110, a touch sensor 120, a storage part 102, an interface part 103, a position detecting part 104, and a motion detecting part 105. The central arithmetic part 101 is a CPU (Central Processing Unit), and executes a program for realizing the operation method according to the present embodiment. The program is executed in at least any of the terminal device 100 and the position measuring device 1 (computer system).

The display part 110 and the touch sensor 120 are provided in the terminal device 100. The storage part 102 may be provided in at least any of the terminal device 100 and the position measuring device 1 or may be provided in a server connected through a network. The interface part 103 has a user interface and a communication interface.

The position detecting part 104 is a part detecting a relative positional relation between the terminal device 100 and the probe 11. As the position detecting part 104, a three-dimensional sensor 50 provided in the position measuring device 1 shown in FIG. 1 or the like is used. The motion detecting part 105 is a part receiving an instruction (movement instruction) for a worker to move the measurement head 10. The motion detecting part 105 detects the movement instruction on the basis of motion performed by the worker in coordination with the touch sensor 120, an acceleration sensor, or the like of the terminal device 100.

(Operation Method of Position Measuring Device: Part 1)

In the present embodiment, the terminal device 100 is used for operating the position measuring device 1. The terminal device 100 includes the display part 110 having the touch sensor 120 and an image acquisition part 150 having a camera for imaging. A worker controls a position of the measurement head 10 or the probe 11 by using the terminal device 100 in order to operate the position measuring device 1.

For operating the position measuring device 1, first, the worker uses the image acquisition part 150 of the terminal device 100 to capture an image of the probe 11 of the measurement head 10 and cause the display part 110 to display the image. The image of the probe 11 is captured as a moving image, and the moving image captured by photographing is displayed on the display part 110.

Next, the worker touches the image of the probe 11 displayed on the display part 110 of the terminal device 100 with a finger F or the like (tap operation). The tap operation allows the three-dimensional sensor 50 to detect a three-dimensional position of the terminal device 100 and to detect the relative positional relation between the terminal device 100 and the probe 11.

Next, if the worker moves the terminal device 100 in this state, the moving mechanism 20 moves the measurement head 10 following the movement of the terminal device 100. That is, the three-dimensional sensor 50 successively detects the three-dimensional position of the terminal device 100, and the measurement head 10 is moved following the movement of the terminal device 100 so as to maintain the relative positional relation between the terminal device 100 and the probe 11 detected when the tap operation is performed. This allows the worker to move a position of the probe 11 by using the terminal device 100 while referring to the image of the probe 11 displayed on the display part 110 of the terminal device 100. Since the position of the probe 11 moves following the movement of the terminal device 100, the worker can intuitively move the probe 11 without touching the probe 11.

Figure 3A:
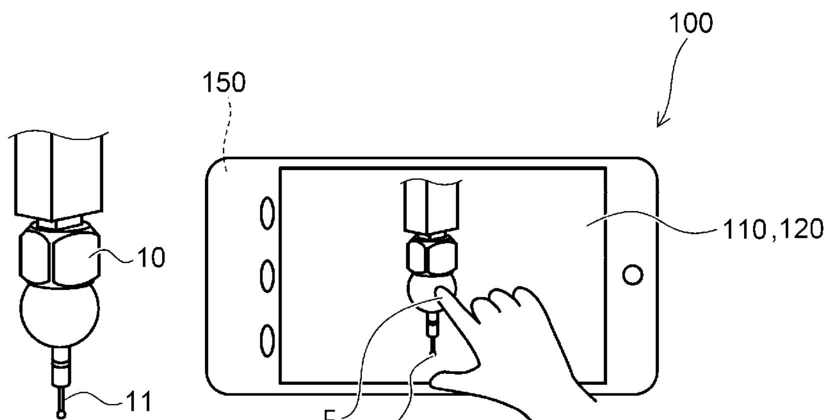
FIGS. 3A to 3C are schematic diagrams showing a movement example of a measurement head using a terminal device.
Figure 3B:
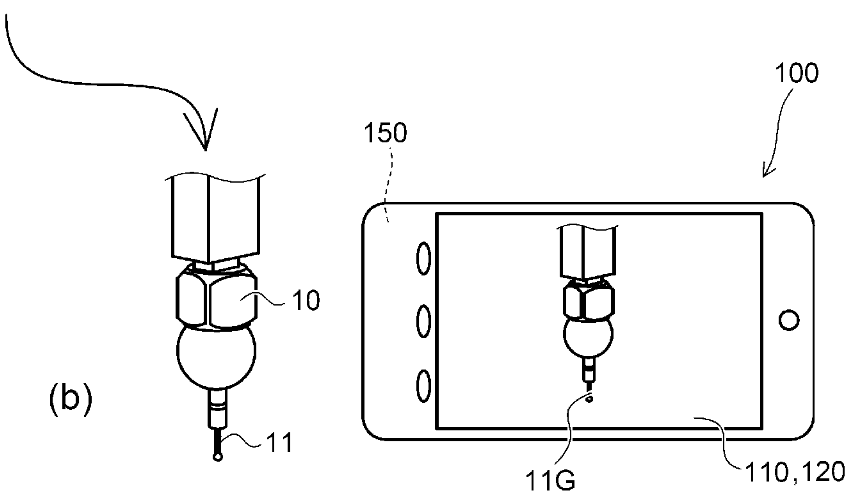
Figure 3C:
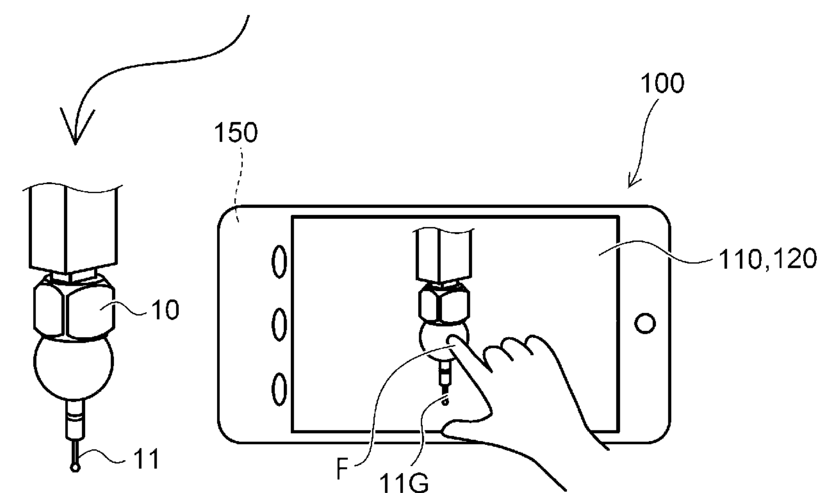

FIGS. 3A to 3C are schematic diagrams showing a movement example of the measurement head using the terminal device.

First, as shown in FIG. 3A, in a state where an image 11G of the probe 11 of the measurement head 10 is displayed on the display part 110 of the terminal device 100, the worker touches the periphery of the image 11G of the probe 11 with the finger F (tap operation). The tap operation is detected by the touch sensor 120, and thereby the three-dimensional sensor 50 detects the relative positional relation between the terminal device 100 and the probe 11. In addition, at a stage where the tap operation is detected by the touch sensor 120, the terminal device 100 enters a state of having received a tracking instruction as one of movement instructions from the worker.

Next, as shown in FIG. 3B, the position of the terminal device 100 is moved. If the terminal device 100 is moved in a state of having received the tracking instruction, the moving mechanism 20 is actuated so as to maintain the relative position between the terminal device 100 and the probe 11 detected when the tap operation is performed, and the measurement head 10 moves.

In this motion, the measurement head 10 will move following the movement of the terminal device 100 so that the display position of the image 11G of the probe 11 on the display part 110 is fixed. Therefore, even if the terminal device 100 is moved, the display position of the image 11G of the probe 11 displayed on the display part 110 remains as is, and the probe 11 will follow the movement in accordance with the movement of the terminal device 100. The worker will be able to intuitively move the probe 11 by moving the terminal device 100 while referring to the image 11G of the probe 11 displayed on the display part 110.

Next, as shown in FIG. 3C, the worker touches the display part 110 with the finger F in a state of having moved the terminal device 100 to a predetermined position of the measurement head 10 (tap operation). The tracking operation is released by detecting the tap operation with the touch sensor 120. After the tracking operation is released, the measurement head 10 does not move even if the terminal device 100 is moved.

Figure 4A:
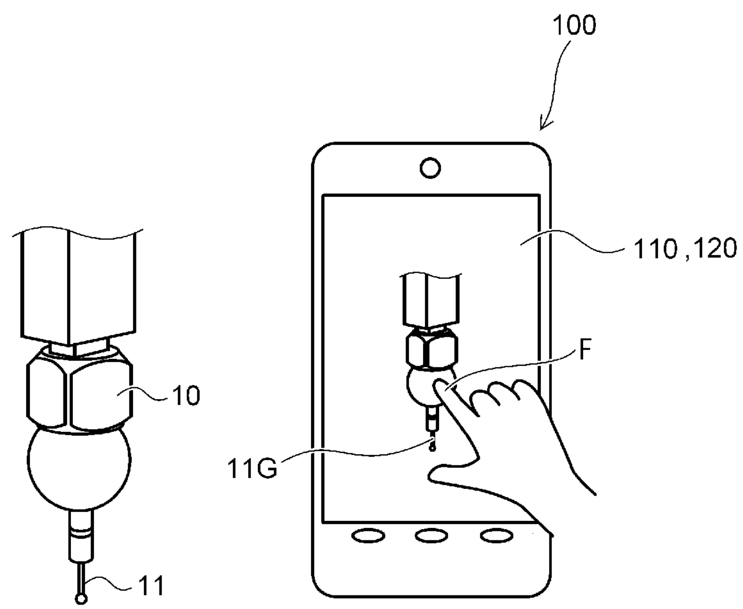
FIGS. 4A and 4B are schematic diagrams showing a movement example of a measurement head using a terminal device.
Figure 4B:
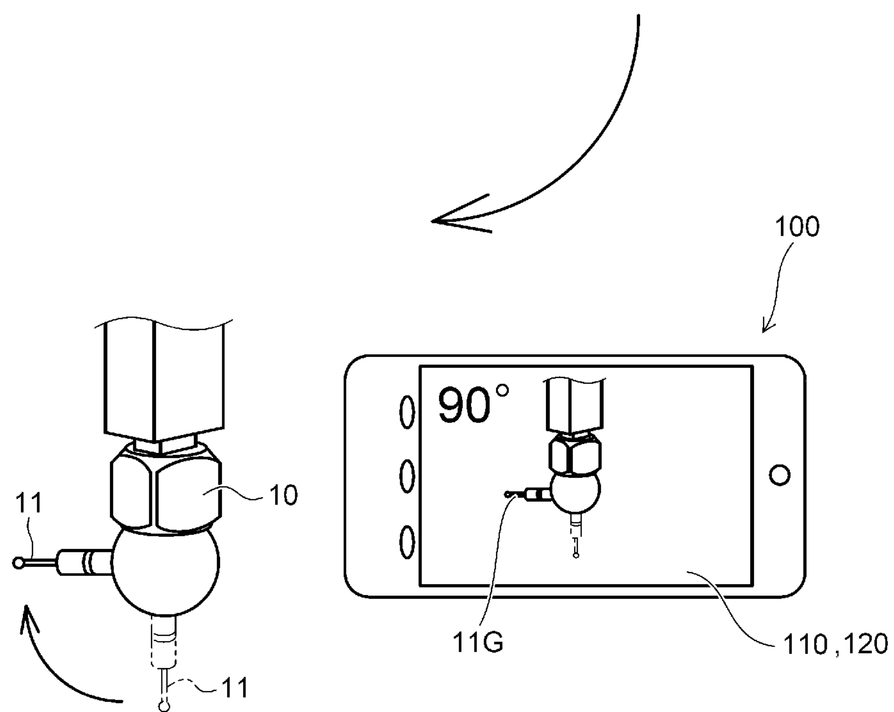

FIGS. 4A and 4B are schematic diagrams showing a movement example of the measurement head using the terminal device.

First, as shown in FIG. 4A, in a state where the image 11G of the probe 11 of the measurement head 10 is displayed on the display part 110 of the terminal device 100, the worker touches the periphery of the image 11G of the probe 11 with the finger F (tap operation). The tap operation is detected by the touch sensor 120, and thereby the three-dimensional sensor 50 detects the relative position between the terminal device 100 and the probe 11. In addition, at a stage where the tap operation is detected by the touch sensor 120, the terminal device 100 enters a state of having received the tracking instruction from the worker.

Next, as shown in FIG. 4B, if the terminal device 100 is rotated, the angle of the probe 11 varies following the rotation of the terminal device 100. That is, if the terminal device 100 is rotated in a predetermined direction, the acceleration sensor of the terminal device 100 detects its rotation angle and rotation direction and the probe 11 is rotated in accordance with the rotation angle and rotation direction.

For example, if the terminal device 100 is rotated to the right by 90 degrees, the probe 11 will also rotate to the right by 90 degrees. This makes it possible to rotate the probe by an intuitive operation in accordance with the rotation of the terminal device 100. In addition, the rotation angle of the terminal device 100 may be displayed numerically on the display part 110 in accordance with the rotation of the terminal device 100. This makes it possible to accurately grasp the rotation angle of the probe 11 following the rotation angle of the terminal device 100.

Note that, in the above operation method, the acceleration speed when the terminal device 100 has moved may be measured by the acceleration sensor provided in the terminal device 100, and the movement of the measurement head 10 may be stopped when the measured acceleration speed exceeds a preset value. This makes it possible to stop the movement of the measurement head 10 and the probe 11 when the terminal device 100 is moved rapidly, and to suppress an unnecessary motion of the measurement head 10 and the probe 11.

Further, in the above operation method, when the worker makes the movement of the measurement head 10 and the probe 11 follow the movement of the terminal device 100, the terminal device 100 may be made to follow the movement only when the terminal device 100 has moved beyond a preset range from the state where the terminal device 100 does not move. That is, the measurement head 10 and the like are not moved in a so-called range of play in the movement of the terminal device 100, and the tracking is started when the terminal device 100 has exceeded the range of play. This makes it possible to suppress an unnecessary motion of the measurement head 10 and the like when unintended vibration (such as hand trembling) of the terminal device 100 has occurred.

In addition, in the above operation example, the measurement head 10 and the probe 11 are moved or rotated by the movement or rotation of the terminal device 100, but the ratio between the movement amount of the terminal device 100 and the movement amount of the measurement head 10 and the probe 11 may be 1:1 or not 1:1. The ratio of movement amount may be preset or may be appropriately changed by the worker.

In addition, in the above operation example, in a case where a predetermined movement operation is performed, the position measuring device 1 may perform processing by regarding that a specific command corresponding to the movement operation has been input. For example, in a case where the terminal device 100 is moved by a predetermined way of movement in a state of performing a tracking operation, the position measuring device 1 may perform processing by regarding that an end-point determination command indicating that the movement terminates at a current position of the probe 11 has been input.

(Operation Method of Position Measuring Device: Part 2)

Next, the operation method (part 2) of the position measuring device 1 according to the present embodiment will be described.

Figure 5A:
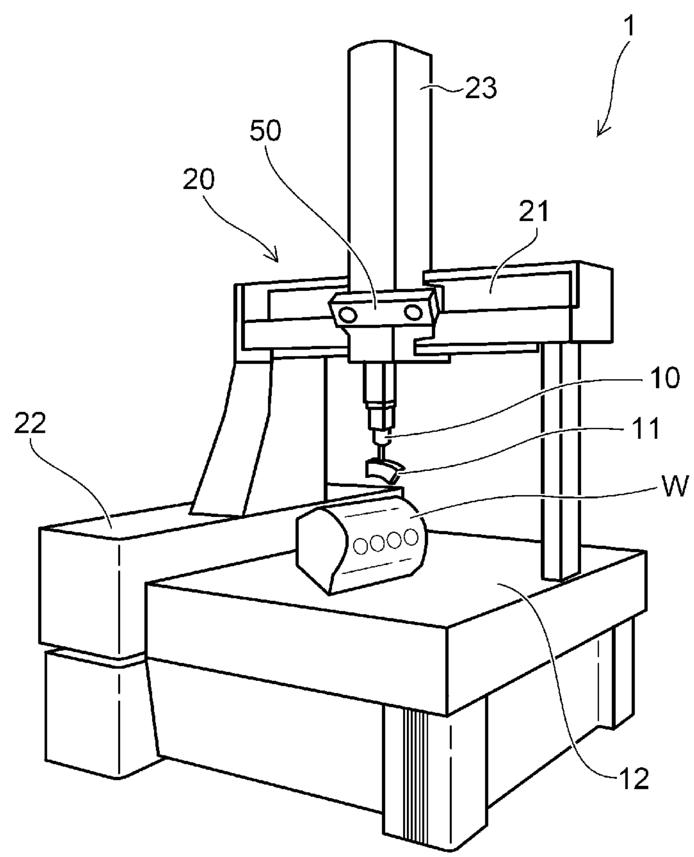
FIGS. 5A and 5B are schematic diagrams exemplifying a position measuring device to which the operation method (part 2) is applied.
Figure 5B:
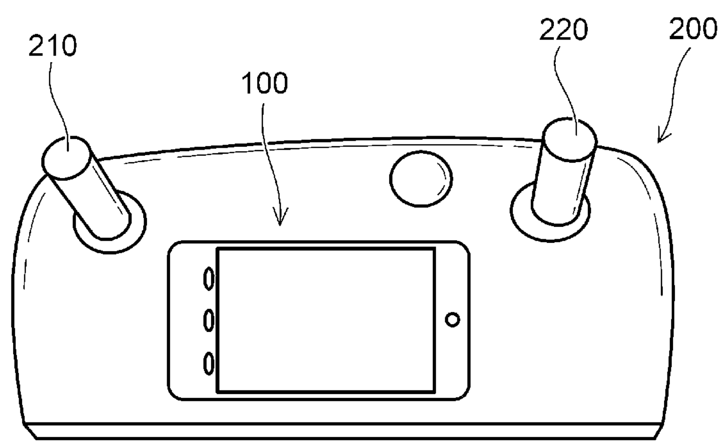

FIGS. 5A and 5B are schematic diagrams exemplifying a position measuring device to which the operation method (part 2) is applied.

FIG. 5A shows an entire configuration of the position measuring device 1 and FIG. 5B shows a controller 200.

As shown in FIG. 5A, the probe 11 of the position measuring device 1 is of a non-contact type. The non-contact probe 11 irradiates an object W with, for example, linear laser light and receives the reflected light to thereby measure a position of the object W.

As shown in FIG. 5B, the controller 200 includes joysticks 210 and 220. In this example, the two joysticks 210 and 220 are provided, and these are operated to send instructions to the moving mechanism 20, thus controlling positions and angles of the measurement head 10 and the probe 11.

Generally, the movement operation of the measurement head 10 and the probe 11 using the joysticks 210 and 220 requires expertise, and a lot of time and practice are required for accurately and quickly moving them to target positions. Further, it is difficult to say that the operation is intuitive.

In the present embodiment, the terminal device 100 is detachably attached to the controller 200. The measurement head 10 and the probe 11 can be intuitively operated by using the terminal device 100.

Figure 6:
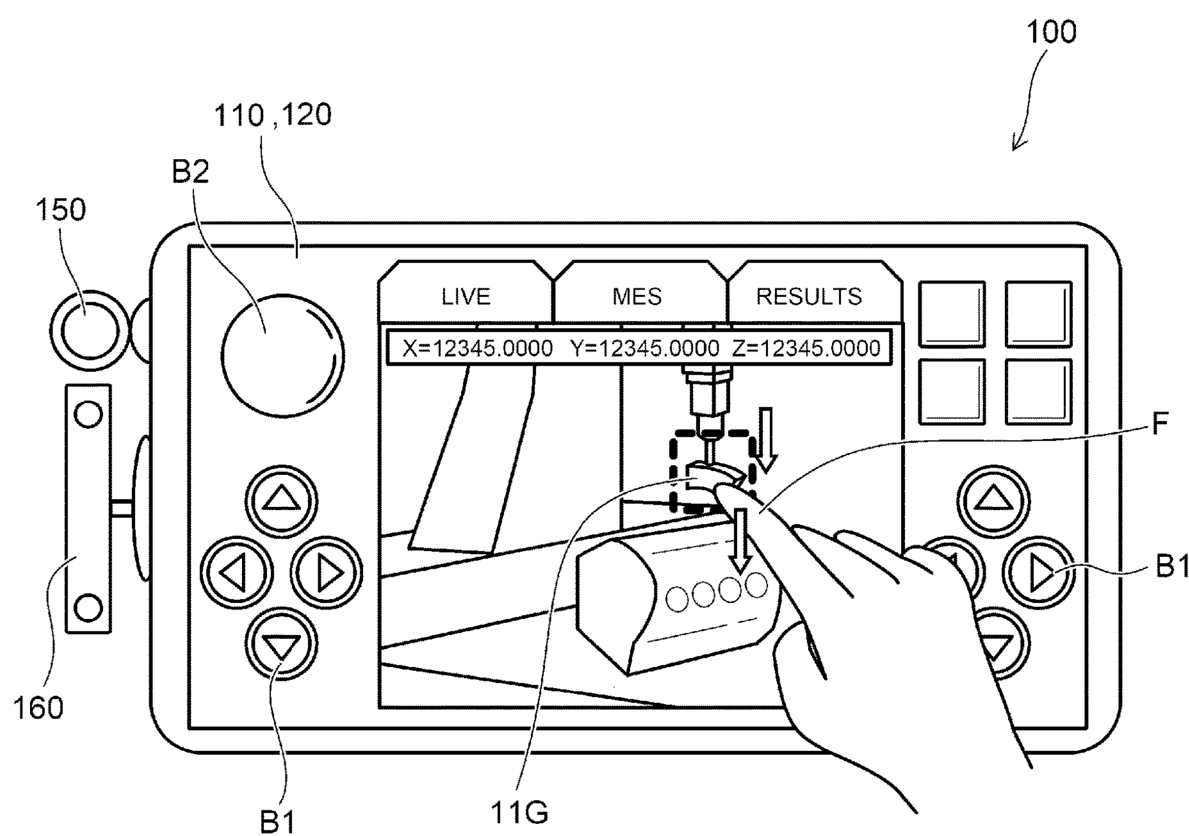
FIG. 6 is a schematic diagram showing one example of operation by the terminal device.

FIG. 6 is a schematic diagram showing one example of operation by the terminal device.

The terminal device 100 can be used in a state of being attached to or detached from the controller 200. When the terminal device 100 is used in a state of being attached to the controller 200, the measurement head 10 and the probe 11 can be operated with the touch operation by the touch sensor 120. When the terminal device 100 is used in a state of being detached from the controller 200, the measurement head 10 and the probe 11 can be operated from a desired position with the terminal device 100 held in a hand.

To move the measurement head 10 by the terminal device 100, first, an image of the measurement head 10 is captured by the image acquisition part 150. The display part 110 displays the image of the measurement head 10 captured by the image acquisition part 150. Further, the image of the object W or the like captured by the image acquisition part 150 is also displayed.

Together with capturing of the image by the image acquisition part 150, the distance to the position measuring device 1 or to the object W is recognized by a three-dimensional sensor 160 provided in the terminal device 100. On this occasion, the three-dimensional positional relation based on a screen image captured by the image acquisition part 150 may be accurately recognized by using CAD data of the position measuring device 1 or the object W.

Next, the periphery of the image 11G of the probe 11 displayed on the display part 110 is touched with the finger F. At a stage where the touch operation is detected by the touch sensor 120, the terminal device 100 enters a state of having received the tracking instruction from the worker. Then, the finger F is made to slide in any direction while the display part 110 is touched with the finger F (drag operation). When the touch sensor 120 detects the distance and direction of the slide of the finger F by the drag operation, the measurement head 10 will move on the basis of the distance and direction of the slide.

That is, since the relative positional relation between the probe 11 and the terminal device 100 has been recognized by the three-dimensional sensor 160, a motion instruction is provided from the terminal device 100 to the moving mechanism 20 on the basis of the distance and direction of the slide of the finger F detected by the touch sensor 120. Thereby, the worker can move the measurement head 10 on the basis of the distance and direction of the slide just by performing the drag operation while touching the probe 11 displayed on the display part 110 with the finger F.

Here, when the probe 11 is moved, the collision between the probe 11 and the object W may be automatically determined by using CAD data of the object W. In addition, the display part 110 displays various button icons B1 and B2, and the position measuring device 1 may be controlled by touching of the button icons B1 and B2 with the finger F. For example, the button icon B1 corresponds to a direction, and the movement direction of the measurement head 10 or the probe 11 can be controlled corresponding to this direction. In addition, the button icon B2 is an icon of a measurement instruction, and the position of the probe 11 on that occasion can be measured by selecting this icon.

The display part 110 may display a current coordinate value (coordinate values of XYZ) of the probe 11 or may display a measurement result. The measurement result may be displayed overlappingly on the image of the object W in the display part 110. In addition, a trajectory of the probe 11 may be checked on a three-dimensional space by a part program prepared in advance.

Figure 7:
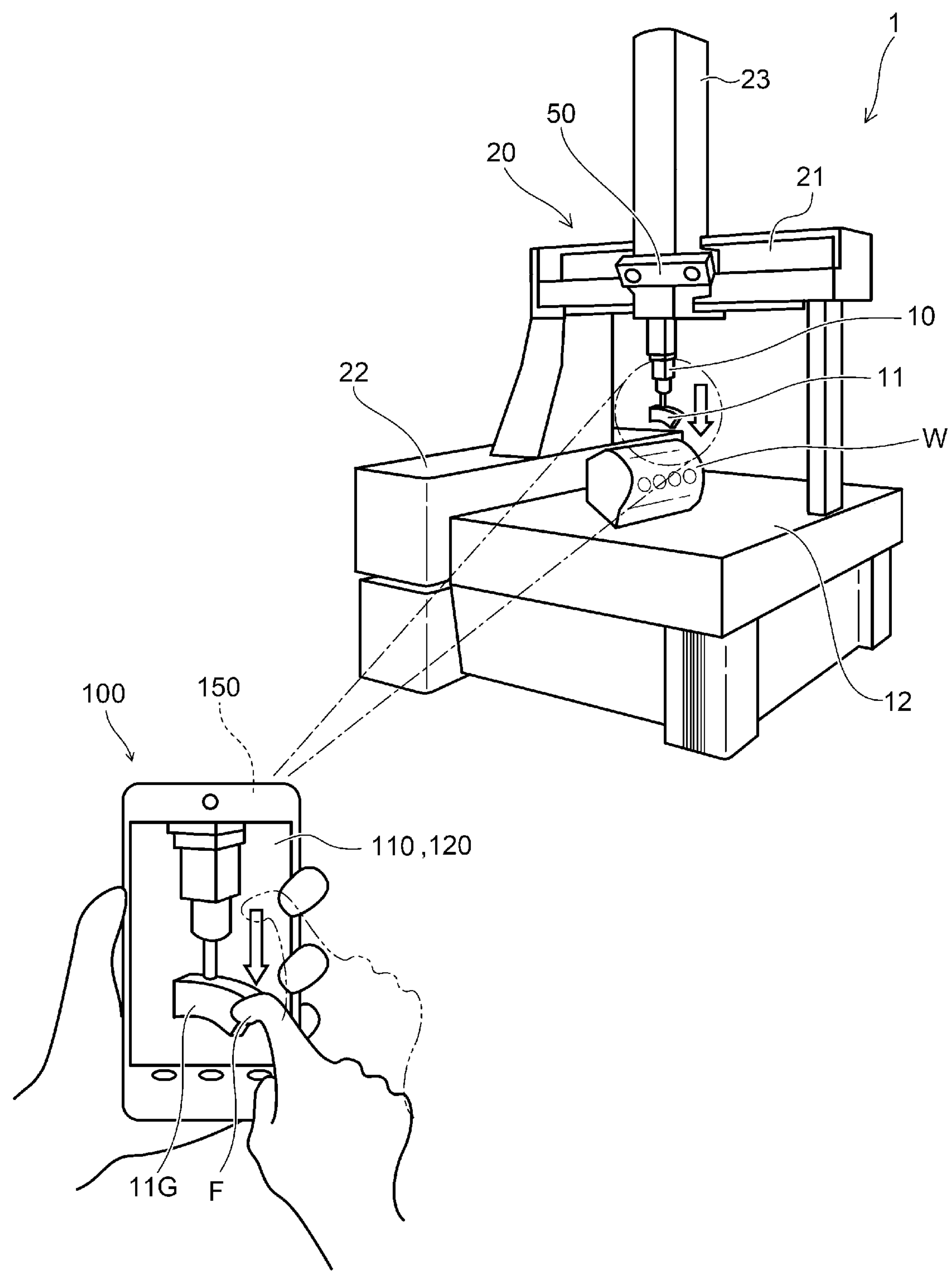
FIG. 7 is a schematic diagram showing an example of using the terminal device in a state of being detached from a controller.

FIG. 7 is a schematic diagram showing an example of using the terminal device in a state of being detached from a controller.

When the terminal device 100 is detached from the controller 200, a separation mode of the terminal device 100 is executed, and the measurement control solely by the terminal device 100 becomes possible. The worker captures an image of the probe 11 by the image acquisition part 150 with the terminal device 100 held in a hand. The display part 110 displays the image 11G of the probe 11 captured by the image acquisition part 150.

The position and posture of the terminal device 100 are always grasped by the acceleration sensor or the three-dimensional sensor 50 built in the terminal device 100. Thereby, the image of the probe 11 captured by the image acquisition part 150 is recognized in real time.

In this state, the finger F is made to slide while the periphery of the image 11G of the probe 11 of the display part 110 is touched with the finger F (drag operation). The distance and direction of the slide of the finger F by the drag operation are detected by the touch sensor 120, and this data is transmitted from the terminal device 100 to the controller 200 via wireless communication or the like. Then, a movement instruction is sent from the controller 200 to the moving mechanism 20 of the position measuring device 1, and the measurement head 10 will move. The movement instruction by the drag operation may be directly transmitted from the terminal device 100 to the position measuring device 1.

Note that, in a case where the image of the probe 11 is expanded or reduced and captured by the image acquisition part 150 of the terminal device 100, a scale factor of the movement distance of the measurement head 10 corresponding to the distance of the slide of the finger F is preferably changed according to a scale factor of the expansion or reduction. That is, even if the distance of the slide of the finger F is the same, when the image is expanded and displayed, control may be made so that the scale factor of the movement distance of the measurement head 10 is made low and the measurement head 10 moves little by little, and when the image is reduced and displayed, control may be made so that the scale factor of the movement distance of the measurement head 10 is made high and the measurement head 10 moves quickly.

Figure 8A:
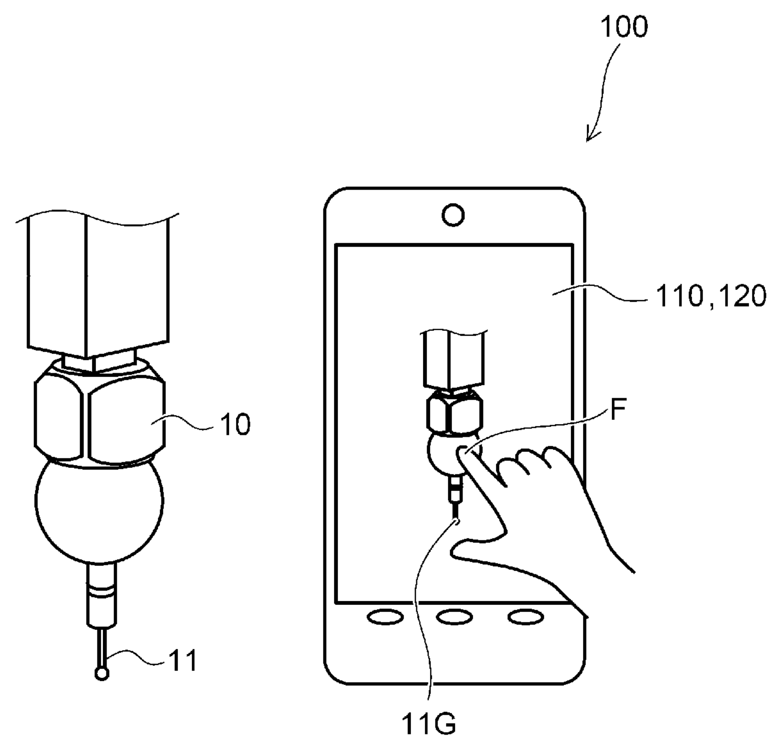
FIGS. 8A and 8B are schematic diagrams exemplifying rotational motion of the probe.
Figure 8B:
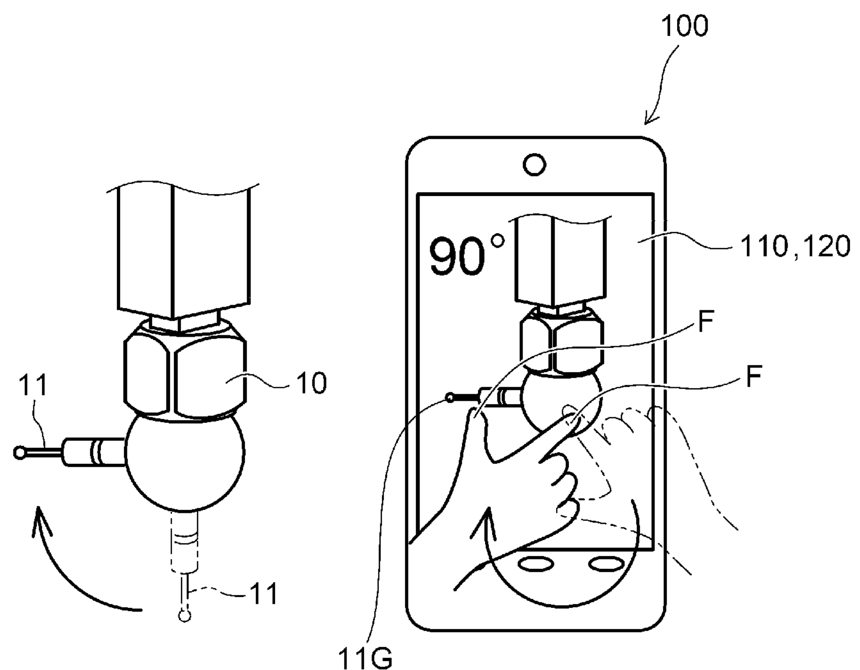

FIGS. 8A and 8B are schematic diagrams exemplifying rotational motion of the probe.

For rotating the probe 11 by using the terminal device 100, first, as shown in FIG. 8A, the periphery of the image 11G of the probe 11 displayed on the display part 110 of the terminal device 100 is touched with the finger F and the probe 11 is selected. The terminal device 100 recognizes the correspondence between the position detected by the touch sensor 120 and the image 11G of the probe 11 and recognizes that the selection of the probe 11 is a tracking instruction in the movement of the probe 11.

Next, as shown in FIG. 8B, the finger F that has touched the periphery of the image 11G is made to slide so as to draw a circle on the display part 110. The rotation direction and amount of the slide of the finger F are detected by the touch sensor 120, and the instruction is transmitted from the terminal device 100 to the position measuring device 1 on the basis of this data to actuate the moving mechanism 20. Thereby, the probe 11 will rotate according to the rotation direction and amount of the slide of the finger F.

For example, if the finger F is made to slide to the right so as to rotate by 90 degrees, the probe 11 will also rotate to the right by 90 degrees. This makes it possible to rotate the probe by an intuitive operation in accordance with the rotation of the terminal device 100. In addition, the rotation angle of the terminal device 100 may be displayed numerically on the display part 110 in accordance with the rotation of the terminal device 100. This makes it possible to accurately grasp the rotation angle of the probe 11 following the rotation motion of the finger F.

(Operation Method of Position Measuring Device: Part 3)

Next, the operation method (part 3) of the position measuring device 1 according to the present embodiment will be described.

In the operation method (part 3), movement control of the measurement head 10 or the like is performed based on the motion (gesture) of a specific region (for example, hand H) of a worker's body.

Figure 9:
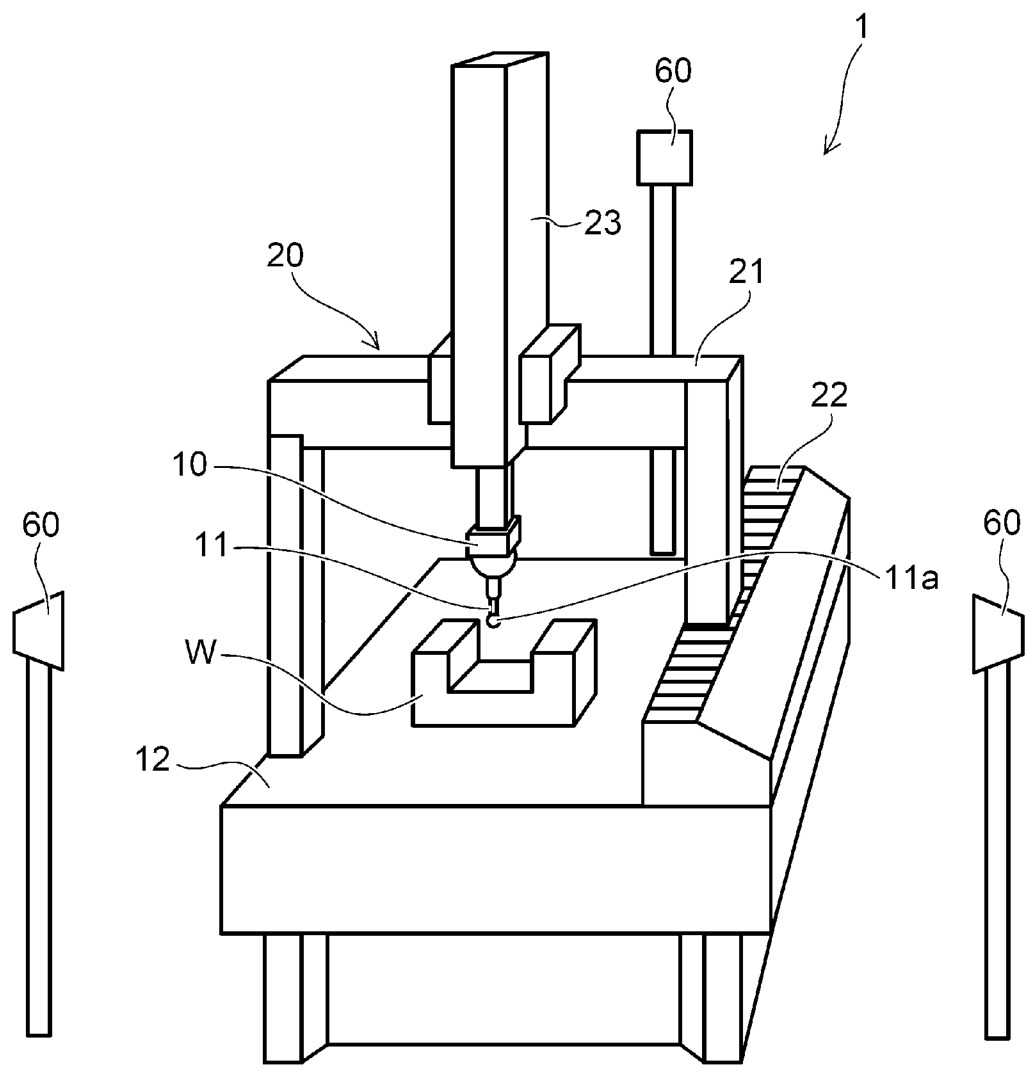
FIG. 9 is a schematic diagram exemplifying a position measuring device to which the operation method (part 3) is applied.

FIG. 9 is a schematic diagram exemplifying a position measuring device to which the operation method (part 3) is applied.

As shown in FIG. 9, the position measuring device 1 is provided with three-dimensional sensors 60. For example, the three-dimensional sensors 60 are arranged around a stage 12 so as not to generate dead angles. The three-dimensional sensors 60 are configured to recognize three-dimensional positions of the object W placed on the stage 12, the measurement head 10, and the other things.

FIGS. 10A to 11B are schematic diagrams showing an example of the operation method (part 3).

Figure 10A:
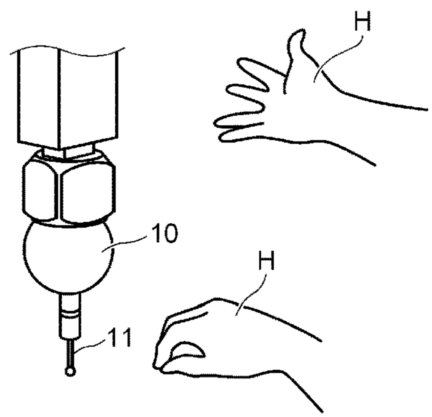
FIGS. 10A to 10C are schematic diagrams showing an example of the operation method (part 3)
Figure 10B:
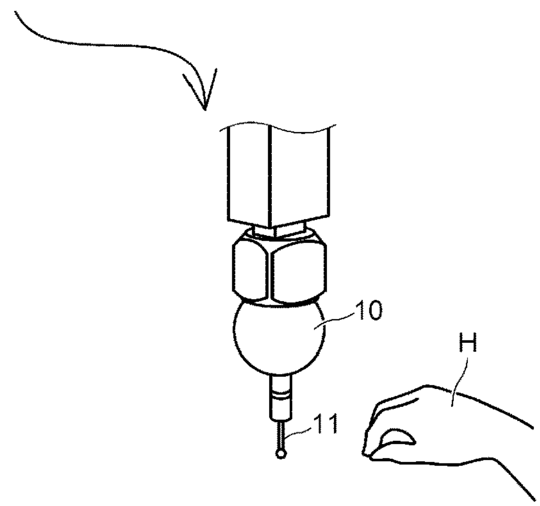
Figure 10C:
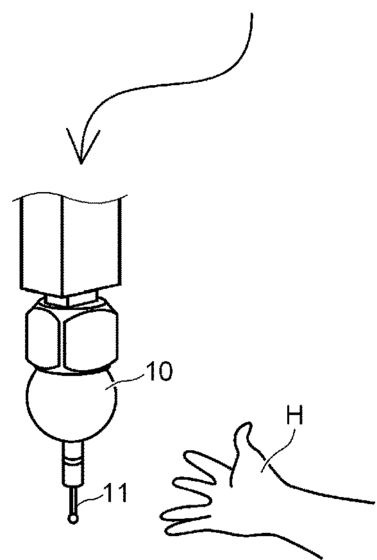

In an example of the operation method shown in FIGS. 10A to 10C, first, as shown in FIG. 10A, such a motion as to close the hand H from the open state and pick up something with a fingertip is performed. The motion of this hand H is detected by the three-dimensional sensors 60, and thus it is recognized that the tracking instruction in the movement of the probe 11 has been issued from the worker. Then, the relative positional relation between the probe 11 and the hand H when the tracking instruction is recognized is detected.

Next, as shown in FIG. 10B, the hand H is moved to any direction with the hand H closed. The movement of the hand H is detected by the three-dimensional sensors 60. Then, the moving mechanism 20 is controlled so as to move the measurement head 10 following the motion of the hand H detected by the three-dimensional sensors 60. The measurement head 10 will move so as to maintain the relative positional relation with the hand H. For example, moving the hand H down will move the measurement head 10 down following the motion of the hand H.

Then, as shown in FIG. 10C, such a motion as to open the hand H in a state where the position of the measurement head 10 is fixed is performed. The motion of this hand H is detected by the three-dimensional sensors 60, and thus it is recognized that release of the tracking operation in the movement of the measurement head 10 has been instructed from the worker. The release instruction is sent to the moving mechanism 20, and thus subsequently the measurement head 10 will not move even if the hand H is moved.

Figure 11A:
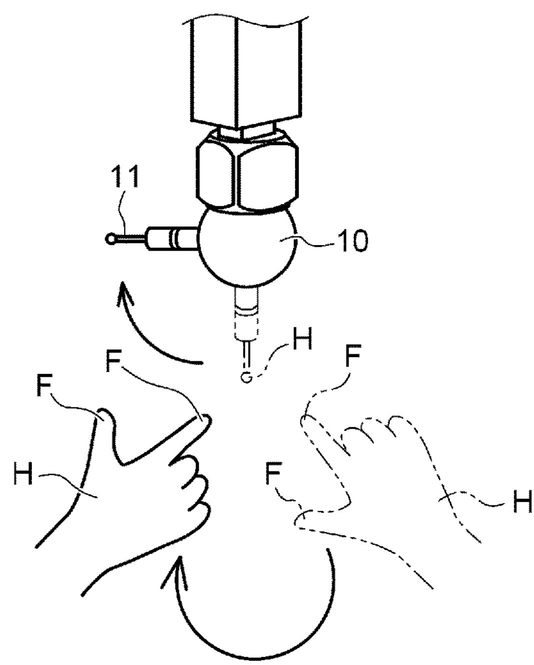
FIGS. 11A and 11B are schematic diagrams showing an example of the operation method (part 3)

In addition, in an example of the operation method shown in FIG. 11A, first, such a motion as to spread two fingers F to a predetermined distance is performed. The motion of the fingers F is detected by the three-dimensional sensors 60, and thus it is recognized that the tracking instruction in the movement of the measurement head 10 has been issued from the worker.

Next, the two fingers F are rotated with the fingers F opened to the predetermined distance. The rotation of the fingers F is detected by the three-dimensional sensors 60. Then, the probe 11 is rotated following the rotation of the fingers F detected by the three-dimensional sensors 60. For example, when the fingers F are rotated to the right by 90 degrees, the probe 11 will also rotate to the right by 90 degrees following the rotation of the fingers F.

Figure 11B:
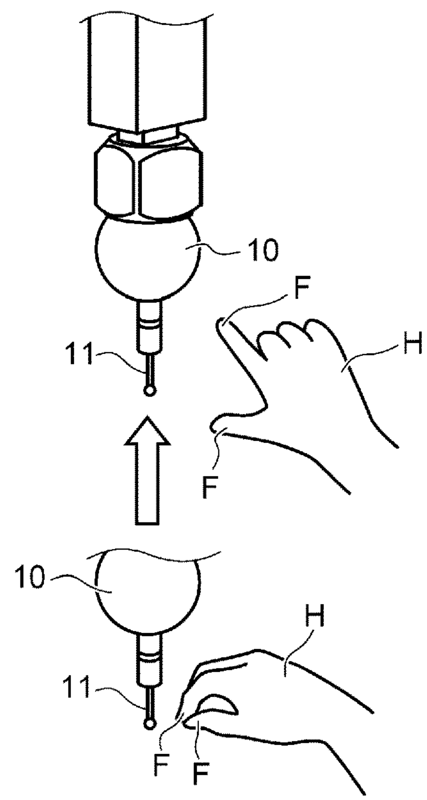

In addition, in an example of the operation method shown in FIG. 11B, first, such a motion as to pick up something with two fingers F is performed. The motion of the fingers F is detected by the three-dimensional sensors 60, and thus it is recognized that the tracking instruction in the movement of the measurement head 10 has been issued from the worker.

Next, the hand H is moved in any direction while keeping the motion to pick up something with the two fingers F. The movement of the hand H is detected by the three-dimensional sensors 60. Then, the moving mechanism 20 is controlled so as to move the measurement head 10 following the motion of the hand H detected by the three-dimensional sensors 60. For example, moving the hand H up will move the measurement head 10 up following the motion of the hand H.

Then, such a motion as to open the two fingers F in a state where the position of the measurement head 10 is fixed is performed. The motion of the two fingers F is detected by the three-dimensional sensors 60, and thus it is recognized that release of the tracking operation in the movement of the measurement head 10 has been instructed from the worker. The release instruction is sent to the moving mechanism 20, and thus subsequently the measurement head 10 will not move even if the hand H is moved.

Next, creation of a measurement program using a motion of the hand H will be described.

Figure 12:
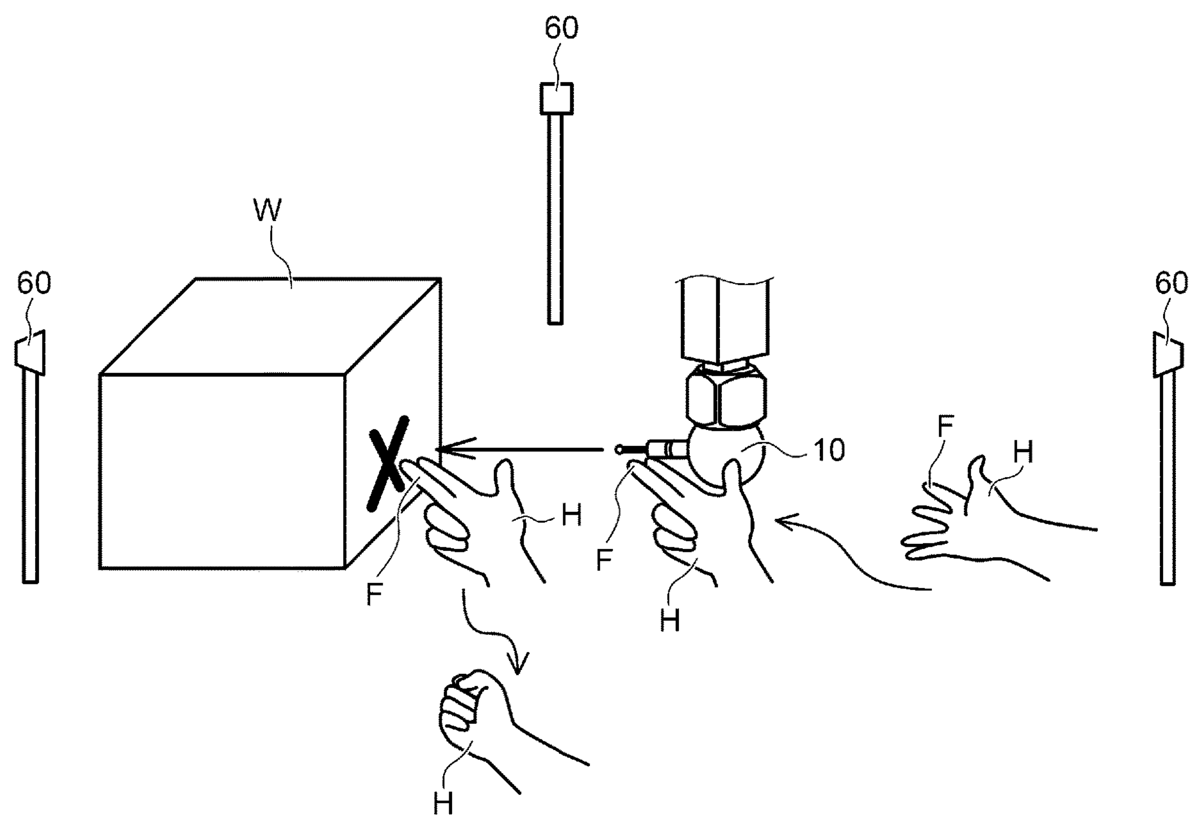
FIG. 12 is a schematic diagram explaining an example of creation of a measurement program.

FIG. 12 is a schematic diagram explaining an example of creation of the measurement program.

First, a motion of forming a predetermined shape with fingers F from a state where the hand H is opened is performed. The motion of the hand H is detected by the three-dimensional sensors 60, and thus it is recognized that the creation instruction of the measurement program has been issued from the worker.

Next, while the shape of the finger F is maintained, the hand H is moved along a path for moving the measurement head 10. Then, the hand H is moved to a detection point of a position of the object W to touch the detection point with the finger F. The three-dimensional sensors 60 have detected the three-dimensional coordinates of the finger F, and it is possible to recognize that the finger F has touched the surface of the object W from the preliminarily read CAD data of the object W. Then, a movement path of the hand H up to this point is stored as the measurement program.

After that, such a motion as to grasp the hand H is performed. The motion is detected by the three-dimensional sensors 60, and thus it is recognized that an instruction of measurement execution has been issued from the worker. Thus, the measurement is started following the measurement program stored in advance. That is, the measurement head 10 moves along the movement path of the hand H designated in advance, and the probe 11 will measure the position of the detection point designated by the figure F.

Note that, in the movement of the measurement head 10 following the measurement program, to avoid collision between the measurement head 10 and the object W in a case of moving the measurement head 10 along the movement path of the hand H, check of the collision is performed based on the shape of the object W preliminarily recognized by the three-dimensional sensors 60, and the CAD data of the object W. When a risk of collision exists, the motion of the measurement head 10 may be stopped or the motion of collision avoidance may be performed. In addition, when the movement path of the measurement head 10 is designated by the hand H, collision with the object W may be checked and warning may be output.

Thus, the measurement head 10 and the probe 11 can be actuated by the motion (gesture) of the hand H and the finger F, and intuitive and simple operation can be realized. Note that, in the above description, the motion of the hand H and the finger F is taken as an example, but a region other than the hand H and the finger F may be used as long as it is a specific region of a worker's body.

As described above, with the operation method of the position measuring device 1 according to the present embodiment, it is possible to accurately and quickly designate a detection point of the object W by intuitive operability, such as directly moving the probe 11 with a hand. This eliminates the need for highly professional knowledge and practice in the operation of position and posture of the probe 11, and makes it possible to suppress error in operation and to shorten a measurement time.

Note that, in the above description, the present embodiment is explained, but the present invention is not limited to these examples. For example, various additions, deletions, and design changes of the constituent elements appropriately applied to the embodiments mentioned above by a person skilled in the art, and appropriate combinations of features of the embodiments are also included in the scope of the present invention as long as they include the gist of the present invention.

INDUSTRIAL APPLICABILITY

The present invention can be suitably used in other than the three-dimensional measuring machine including the moving mechanism 20 of XYZ. For example, it can be suitably used even in a position measuring device of an articulate arm type or of a monoaxial movement type.

What is claimed is:

1. An operation method of a position measuring device that includes, a measurement head having a probe for designating a detection point of a position of an object, and a moving mechanism for moving the measurement head, and acquires a coordinate of the detection point designated by the probe, the operation method comprising the steps of:

using a terminal device including an image acquisition part and a display part to acquire an image of the probe by the image acquisition part and display the image on the display part;

detecting a relative positional relation between the probe and the terminal device when having received a movement instruction by the terminal device in a state where an image of the probe is displayed on the display part; and performing a movement control of the measurement head following the movement instruction received by the terminal device by actuating the moving mechanism on the basis of the positional relation.

2. The operation method of a position measuring device according to claim 1, wherein the step of performing a movement control of the measurement head includes moving the measurement head following movement of the terminal device so that a display position of the image of the probe on the display part when having received the movement instruction is fixed.

3. The operation method of a position measuring device according to claim 1, further comprising the steps of:

releasing a state where the display position of the image of the probe on the display part is fixed; and stopping movement of the measurement head in a state where fixing of the display position is released.

4. The operation method of a position measuring device according to claim 1, wherein the step of performing a movement control of the measurement head includes stopping movement of the measurement head in a case where an acceleration speed when the terminal device has moved exceeds a preset value.

5. The operation method of a position measuring device according to claim 1, wherein the step of performing a movement control of the measurement head includes, in a case where the terminal device has moved exceeding a preset range from a state where the terminal device does not move, starting movement of the measurement head following the movement of the terminal device.

6. The operation method of a position measuring device according to claim 1, wherein the step of performing a movement control of the measurement head includes varying an angle of the probe in accordance with rotational movement of the terminal device.

7. The operation method of a position measuring device according to claim 1, wherein according to a predetermined movement operation for the terminal device, the position measuring device performs processing by regarding that a specific command corresponding to the movement operation has been input.

8. The operation method of a position measuring device according to claim 1, wherein the display part has a touch sensor, and the step of performing a movement control of the measurement head includes, after having received the movement instruction, moving the measurement head on the basis of a distance of contact and a direction of contact detected by the touch sensor.

9. An operation method of a position measuring device that includes, a measurement head having a probe for designating a detection point of a position of an object, and a moving mechanism for moving the measurement head, and acquires a coordinate of the detection point designated by the probe, the operation method comprising the steps of:

detecting a position of a specific region of a worker's body by a three-dimensional position sensor to detect a relative positional relation between the specific region and the probe; and detecting motion of the specific region by the three-dimensional position sensor to perform a movement control of the measurement head following the motion of the specific region by actuating the moving mechanism on the basis of the positional relation and the motion of the specific region.

10. The operation method of a position measuring device according to claim 9, wherein the specific region is a hand, and the step of performing a movement control of the measurement head includes moving the measurement head on the basis of a type of motion, a motion amount, and a motion direction of the hand.

* * * * *